US010485382B2

(12) United States Patent
Allen et al.

(10) Patent No.: US 10,485,382 B2
(45) Date of Patent: Nov. 26, 2019

(54) FOOD PROCESSOR WITH SLICE SELECTOR DISC

(71) Applicant: Sunbeam Products, Inc., Boca Raton, FL (US)

(72) Inventors: David Allen, Fort Lauderdale, FL (US); Carl Roger Hermann, Somerville, MA (US); Kelli Ann Lynch, Fort Collins, CO (US); Alex Kirby Tee, Arlington, MA (US)

(73) Assignee: Sunbeam Products, Inc., Boca Raton, FL (US)

( * ) Notice: Subject to any disclaimer, the term of this patent is extended or adjusted under 35 U.S.C. 154(b) by 398 days.

(21) Appl. No.: 15/219,209

(22) Filed: Jul. 25, 2016

(65) Prior Publication Data

US 2017/0020339 A1 Jan. 26, 2017

Related U.S. Application Data

(60) Provisional application No. 62/196,046, filed on Jul. 23, 2015.

(51) Int. Cl.
*A47J 43/07* (2006.01)
*A47J 43/046* (2006.01)
(Continued)

(52) U.S. Cl.
CPC ......... *A47J 43/0722* (2013.01); *A47J 43/046* (2013.01); *B26D 1/29* (2013.01);
(Continued)

(58) Field of Classification Search
CPC .... B26D 1/29; B26D 2210/02; B26D 7/0641; B26D 7/2621; A47J 43/0722; A47J 43/046
(Continued)

(56) References Cited

U.S. PATENT DOCUMENTS

| 243,139 A | 6/1881 | Kimmel |
| 3,610,304 A | 10/1971 | Popeil |

(Continued)

FOREIGN PATENT DOCUMENTS

| CA | 1092494 | 12/1980 |
| CN | 2787112 | 6/2006 |

(Continued)

*Primary Examiner* — Shelley M Self
*Assistant Examiner* — Mohammed S. Alawadi
(74) *Attorney, Agent, or Firm* — Husch Blackwell LLP

(57) ABSTRACT

A food processor including a reversible motor disposed in a base for generating a rotational force, a processor container removably attached to the base, a spindle rotated by the reversible motor when energized, and a slicing disc rotatably coupled to the spindle, the slicing disc having a radially extending slicing blade formed on one side thereof configured to perform a slicing operation and a plurality radially extending shredding blades disposed oppositely to the slicing blade on the slicing disc configured to perform a shredding operation. The slicing disc is automatically rotated in a first direction by the motor when the first and third discrete positions are selected on a slice selector disc corresponding to the slicing and dicing operations and automatically rotated in a second direction by the motor when the second discrete position is selected on the slice selector disc corresponding to the shredding operation.

18 Claims, 4 Drawing Sheets

(51) Int. Cl.
  *B26D 1/29* (2006.01)
  *B26D 7/26* (2006.01)
  *B26D 7/06* (2006.01)

(52) U.S. Cl.
  CPC ......... *B26D 7/0641* (2013.01); *B26D 7/2621* (2013.01); *B26D 2210/02* (2013.01)

(58) Field of Classification Search
  USPC .................................. 241/100; 99/537, 567
  See application file for complete search history.

(56) References Cited

U.S. PATENT DOCUMENTS

| | | | |
|---|---|---|---|
| 3,664,396 A | 5/1972 | Tremblay | |
| 3,784,118 A | 1/1974 | Hurwitz | |
| 4,199,112 A | 4/1980 | McLean | |
| 4,560,111 A | 12/1985 | Cavalli | |
| 4,691,870 A | 9/1987 | Fukunaga et al. | |
| 4,723,719 A | 2/1988 | Williams | |
| 5,197,681 A | 3/1993 | Liebermann | |
| 5,992,287 A | 11/1999 | Dube | |
| 6,364,226 B1 | 4/2002 | Kubicko | |
| 6,632,013 B2 | 10/2003 | Wulf et al. | |
| 6,748,853 B1 * | 6/2004 | Brady | A47J 43/0716 241/37.5 |
| 7,681,817 B2 | 3/2010 | Orent | |
| D679,140 S | 4/2013 | Faram | |
| 8,677,895 B2 | 3/2014 | Beber et al. | |
| 9,149,156 B2 | 10/2015 | Rosenzweig et al. | |
| 9,999,321 B2 * | 6/2018 | Chung | B26D 1/29 |
| 2010/0154660 A1 * | 6/2010 | Beber | A47J 43/0711 99/537 |
| 2011/0139017 A1 | 6/2011 | Beber et al. | |
| 2012/0018559 A1 * | 1/2012 | Conti | A47J 43/0711 241/152.2 |
| 2014/0061344 A1 * | 3/2014 | Conti | A47J 43/0722 241/100 |
| 2014/0147573 A1 | 5/2014 | Mercanti | |
| 2014/0306047 A1 | 10/2014 | Lee et al. | |

FOREIGN PATENT DOCUMENTS

| | | |
|---|---|---|
| WO | 0183110 | 11/2001 |
| WO | 03057355 | 7/2003 |

* cited by examiner

FOOD PROCESSOR WITH SLICE SELECTOR DISC

This invention claims benefit of U.S. Provisional Patent Application No. 62/196,046 filed on Jul. 23, 2015, which is hereby incorporated by reference in its entirety.

BACKGROUND OF THE INVENTION

Field of the Invention

The invention relate to a food processor, and more particularly, to a food processor having a slice selection disc which allows the consumer to use only one cutting disc for multiple cutting functions without the need to swap different cutting discs.

Discussion of the Related Art

Food processors are known in the prior art to slice, shred, dice or otherwise cut a food ingredient, such as vegetables, fruits, cheese, nuts and meats. Typically, such food processors have a slicing disc disposed in a processor container in which the slicing disc has a blade system for cutting a food ingredient. A lid on the processor container covers the slicing disc. The lid includes a feed tube for providing a food ingredient into the processor container as the slicing disc is rotated such that the blade system can slice, shred, dice or otherwise cut the food ingredient, which then falls to the bottom of the processor container or out of the processor container through a discharge outlet.

SUMMARY OF THE INVENTION

In an embodiment, there is provided a food processor including a reversible motor disposed in a base for generating a rotational force, a processor container removably attached to the base, a spindle rotated by the reversible motor when energized, a slicing disc rotatably coupled to the spindle, the slicing disc having a radially extending slicing blade formed on one side thereof configured to perform a slicing operation and a plurality of radially extending shredding blades disposed oppositely to the slicing blade on the slicing disc configured to perform a shredding operation. There is a selector configured to select performing the slicing operation or performing the shredding operation. The slicing disc is automatically rotated in a first direction by the motor when the slicing operation is selected by the selector and the slicing disc is automatically rotated in a second direction by the motor when the shredding operation is selected by the selector.

In an embodiment, there is provided a food processor including a reversible motor disposed in a base for generating a rotational force, a processor container removably attached to the base, a spindle rotated by the reversible motor when energized, a slicing disc rotatably coupled to the spindle, the slicing disc having a radially extending slicing blade formed on one side thereof configured to perform a slicing operation and a plurality of radially extending shredding blades disposed oppositely to the slicing blade on the slicing disc configured to perform a shredding operation.

A slice selector disc is disposed beneath the slicing disc and rotatably mounted on the base such that it can be rotated to select one of a plurality of discrete positions, a first of the discrete positions being selected for the slicing operation, a second of the discrete positions being selected for the shredding operation and a third discrete position for a dicing operation, and the slice selector disc includes an associated first food processing configuration formed in the slice selector disc corresponding to the first discrete position being selected for the slicing operation, an associated second food processing configuration formed in the slice selector disc corresponding to the second discrete position being selected for the shredding operation, and an associated third food processing configuration formed in the slice selector disc corresponding to the third discrete position being selected for the dicing operation.

The slicing disc is automatically rotated in a first direction by the motor when the first and third discrete positions are selected on the slice selector disc corresponding to the slicing and dicing operations and the slicing disc is automatically rotated in a second direction by the motor when the second discrete position is selected on the slice selector disc corresponding to the shredding operation.

In an embodiment, there is provided a food preparation appliance including a reversible rotary power source disposed in a base, a slicing disc rotatably coupled to the source of rotary power, the slicing disc having a radially extending slicing blade formed on one side thereof configured to perform a slicing operation and a plurality of radially extending shredding blades disposed oppositely to the slicing blade on the slicing disc configured to perform a shredding operation.

A slice selector disc is disposed beneath the slicing disc and rotatably mounted on the base such that it can be rotated to select one of a plurality of discrete positions, a first of the discrete positions being selected for the slicing operation, a second of the discrete positions being selected for the shredding operation and a third discrete position being selected for a dicing operation, and the slice selector disc includes an associated first food processing configuration formed in the slice selector disc corresponding to the first discrete position being selected for the slicing operation, an associated second food processing configuration formed in the slice selector disc corresponding to the second discrete position being selected for the shredding operation, and an associated third food processing configuration formed in the slice selector disc corresponding to the third discrete position being selected for the dicing operation.

The slicing disc is automatically rotated in a first direction by the rotary power source when the first and third discrete positions are selected on the slice selector disc corresponding to the slicing and dicing operations and the slicing disc is automatically rotated in a second direction by the rotary power source when the second discrete position is selected on the slice selector disc corresponding to the shredding operation.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

DETAILED DESCRIPTION OF THE PREFERRED EMBODIMENTS

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art.

The invention concerns a food processor including a motorized base and a detachable processor container. The motorized base includes a motor and controls, either electronic or manual, for controlling the speed of the motor. The processor container can be a transparent container made of either glass or plastic and includes a removable lid. The processor container is removably detachable from the motorized base for ease in cleaning the container. The motorized base can receive the container and can impart the rotational power of the motor as a rotational force to a spindle extending through the center of the container. A feed tube is formed in the lid including a removable food pusher tube. The feed tube directs food into a rotating slicing disc in the container. A manually rotated food slice selector disc is disposed beneath the slicing disc for selecting a slice type, e.g., slicing, dicing and shredding which also engages a sensor for detecting the desired slice type and controlling the direction of rotation of the motor depending on the selected slice type.

Figure 1:
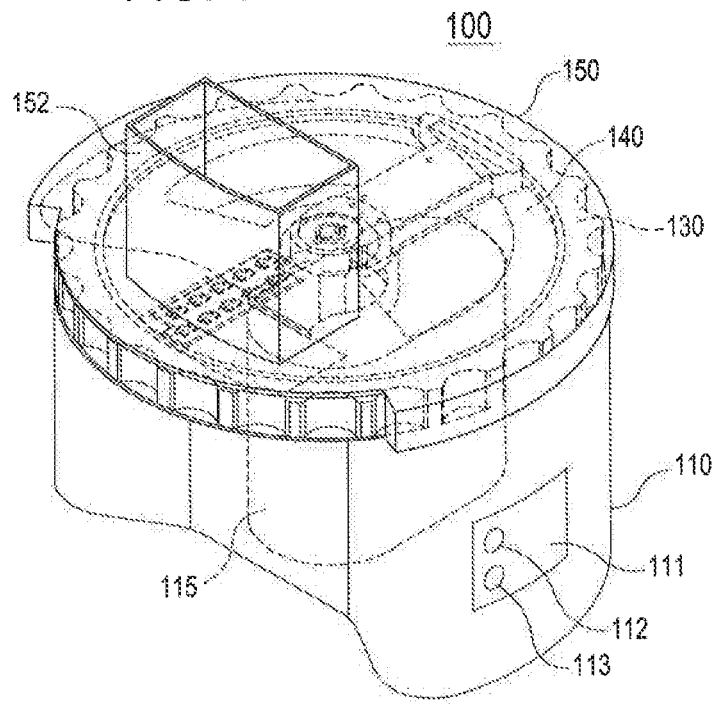
FIG. 1 is a perspective view of a food processor according to an embodiment of the invention.
Figure 2:
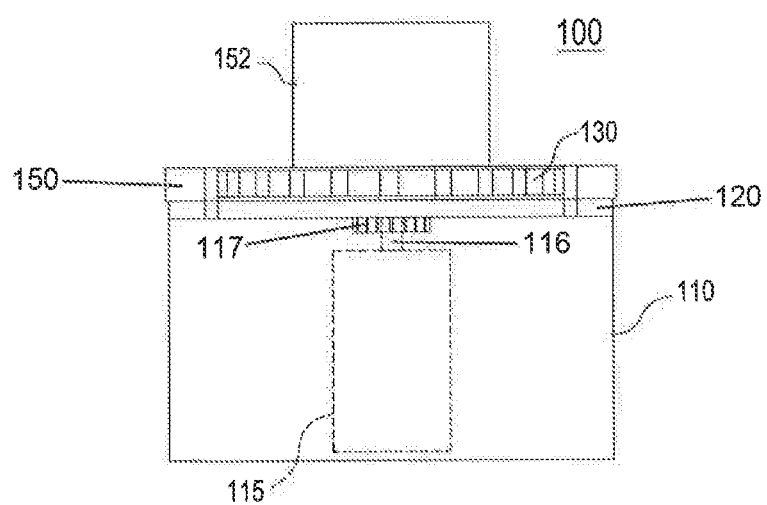
FIG. 2 is a front view of the food processor of FIG. 1.
Figure 3:
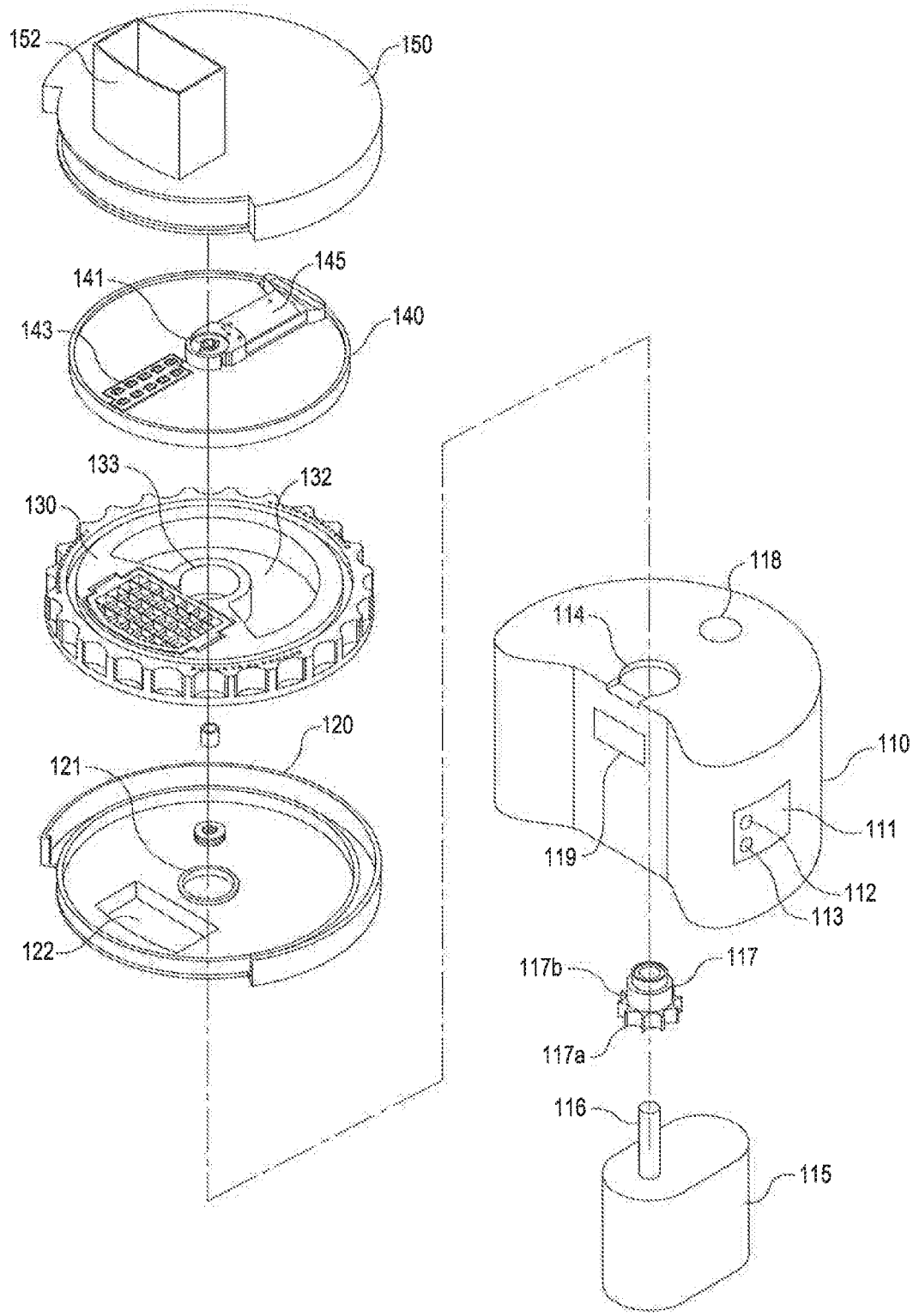
FIG. 3 is an exploded front perspective view of the food processor of FIG. 1.

Referring now to FIGS. 1 to 3, there is illustrated various view of an embodiment of a food processor 100 that is useful for understanding the invention. The food processor 100 includes a base 110 on which a processor container 120 is received. The processor container 120 is removably attached to the base 110. The processor container 120 has a lid 150 for enclosing the processor container 120 to keep food ingredients within the processor container 120. The lid 150 has a feed tube 152 to assist in introducing food ingredients into the processor container 120.

A slicing disc 140 and a food slice selector disc 130 disposed beneath the slicing disc 140 are inserted into the processor container 120 and covered by the lid 150. The slicing disc 140 is rotated by a spindle 116 rotatably connected to a motor 115 in the base 110. The spindle 116 protrudes through an aperture 114 in the base 110 and is fitted into an aperture 141 in the slicing disc 140. Similarly, the spindle 116 protrudes through an aperture 121 in the processor container 120 and an aperture 133 in the food slice selector disc 130. The motor 115 is electrically connected to an electronic control panel 111 which includes electronic controls for controlling the operation of the motor 115 including switches 112, 113 for turning electrical power off/on to the motor 115 and controlling the motor speed, respectively. The electronic control panel 111 may be controlled with a microprocessor (not shown) including memory (not shown) containing pre-programmed motor routines.

Figure 4:
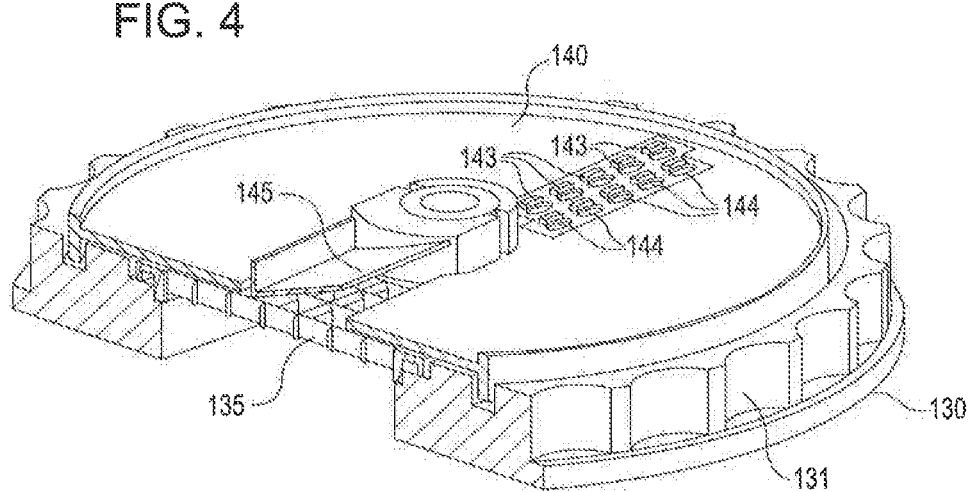
FIG. 4 is a perspective view of the food slicing disc and food slice selector disc of the food processor of FIG. 1.
Figure 5:
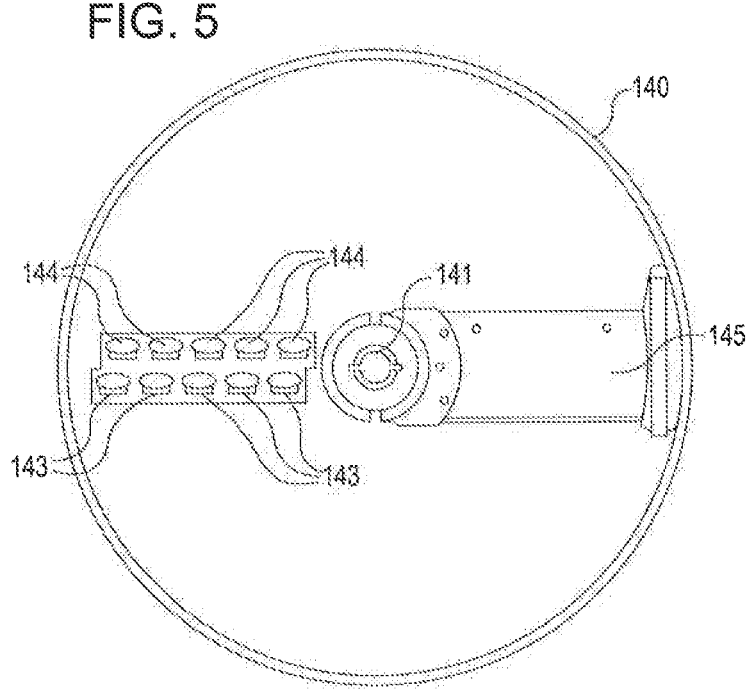
FIG. 5 is a top view of the food slicing disc of the food processor of FIG. 1.
Figure 6:
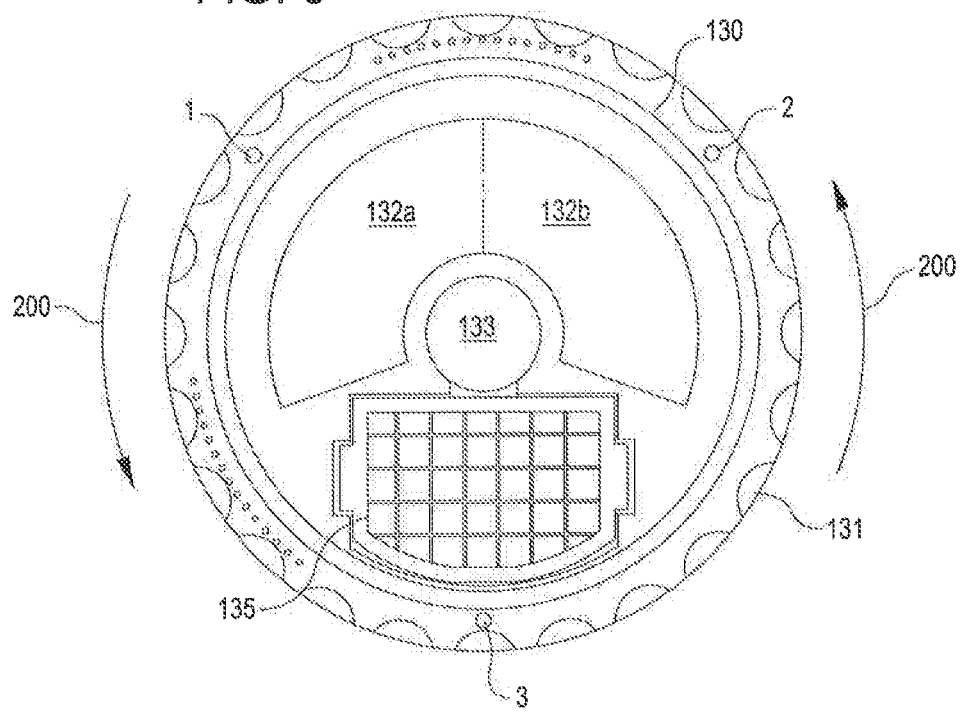
FIG. 6 is a top view of the food slice selector disc of the food processor of FIG. 1.

Referring now also to FIGS. 4 to 6, there is illustrated various views of the food slicing disc 140 and the food slice selector disc 130 of the food processor 100 that are useful for understanding the invention. The food slicing disc 140 includes a radially extending blade 145 for cutting food into slices when the motor 115 is rotated in the counter-clockwise direction. Food is fed into the feed tube 152 in the lid 150 and directed into the path of the slicing blade 145 when the slicing disc 140 is rotated in the counter-clockwise direction. The cut food slices are directed through a gap between the slicing blade 145 and the slicing disc 140 to the food slice selector disc 130 disposed below for further processing as discussed below.

Similarly, food is fed into the feed tube 152 in the lid 150 and directed into the path of a plurality of shredding blades 143 when the slicing disc 140 is rotated in the clockwise direction. The plurality of shredding blades 143 are staggered in the radial direction and located oppositely on the food slicing disc 140 from the slicing blade 145. The shredding blades 143 shred food into strips of food when the slicing disc 140 is rotated by the motor 115 in the clockwise direction. Each of the shredding blades 143 have a corresponding aperture 144 disposed in front of it for directing the newly cut shred of food through the slicing disc 140 towards the food slice selector disc 130 disposed below for further processing as discussed below.

The slicing blade 145 and the shredding blades 143 are ramped on their rear surfaces so that when the slicing disc 140 is rotated in the opposite direction of their cutting path food will just pass over the blades. For example, when the slicing disc 140 is rotated counter-clockwise for slicing food, food will be cut by the slicing blade 145 but pass harmlessly over the shredding blades 143. Oppositely, when the slicing disc 140 is rotated clockwise for shredding food, food will be cut by the shredding blades 143 into strips (e.g., julienne strips) but pass harmlessly over the slicing blade 145.

The food slice selector disc 130 disposed beneath the slicing disc 140 may be manually rotated for selecting a type of food cut, e.g., slicing, dicing and shredding. The food slice selector disc 130 is manually rotated in the direction of arrows 200 to one of a plurality of discrete positions 1, 2 or 3 (relative to the front of the food processor 100) each corresponding to a desired type of food cut. For example, when it is desired to have a slice cut for the food, the food slice selector disc 130 is rotated so that a first portion 132a of an arc shaped aperture 132 formed in the food slice selector disc 130 is disposed beneath and in alignment with the elongated axis of the feed tube 152 and the discharge outlet 122. The food slice selector disc 130 has a plurality of notches 131 on its periphery to facilitate rotation of the food slice selector disc 130 manually. In addition, a sensor 118 is provided on the base 110 in operative engagement with the food slice selector disc 130 to sense which of the discrete positions 1, 2 or 3 the food slice selector disc 130 is in. The sensor 118 may be any type of sensing means including optical, magnetic or switch actuated sensors but this is not meant to be limiting.

In the foregoing example, the sensor 118 would detect the food slice selector disc 130 is in the first discrete position 1 (for slicing) and cause the motor 115 to rotate in the counter-clockwise direction. Food fed into the feed tube 152 would be directed into the slicing blade 145 on the slicing disc 140 and through the first portion 132a of the aperture 132 to the discharge outlet 122 of the processor container 120. An optional angled food discharge chute (not shown) may further direct the food slices into a bowl or other vessel disposed beneath.

In an embodiment, the food slice selector disc 130 may be rotated to a second discrete position 2 (for shredding) so that a second portion 132b of the arc shaped aperture 132 formed in the food slice selector disc 130 is disposed beneath and in alignment with the elongated axis of the feed tube 152 and the discharge outlet 122. The sensor 118 detects that the food slice selector disc 130 is in the second discrete position 2 and causes the motor 115 to rotate in the clockwise direction. Food fed into the feed tube 152 would be directed into the shredding blades 143 on the slicing disc 140 and pass through the second portion 132b of the arc shaped aperture 132 in the food slice selector disc 130 to the discharge outlet 122 of the processor container 120. The shredded food may be further directed into a bowl or other vessel disposed below.

In an embodiment, the food slice selector disc 130 may be rotated to a third discrete position 3 (for dicing as illustrated in FIGS. 1 and 3) so that a dicing blade lattice 135 disposed in the food slice selector disc 130 is disposed beneath and in alignment with the elongated axis of the feed tube 152 and the discharge outlet 122 of the processor container 120. The dicing blade lattice 135 is comprised of a plurality of equally sized square apertures having upwardly facing blades at the top of the walls forming the apertures. The sensor 118 detects that the food slice selector disc 130 is in the third discrete position 3 and causes the motor 115 to rotate in the clockwise direction. Food fed into the feed tube 152 is then directed into the slicing blade 145 on the slicing disc 140 and pass through the dicing blade lattice 135 disposed in the food slice selector disc 130 to the discharge outlet 122 of the processor container 120. As the food slices pass through the dicing blade lattice 135, the food slices are cut another time or diced into small cubes. The cubes of food are directed to the discharge outlet 122 of the processor container 120 and then may be further directed into a bowl or other vessel disposed below.

In an embodiment, there is a manually adjusted slice thickness control 117 disposed in the base 110 that has a thumbwheel portion 117a that protrudes through a rectangular aperture 119 formed in the front of the base 110. The thumbwheel portion 117a is connected to a rotary portion 117b that protrudes through the aperture 114 in the base, the aperture 121 in the processor container 120, and the aperture 133 in the food slice selector disc 130 to connect to a mechanical linkage (not shown) on the underside of the food selector disc 140. Rotating the thumbwheel 117a causes the rotary portion 117b to turn the mechanical linkage (not shown) to cause the pitch of the slicing blade 145 to vary for selecting a desired slice thickness when the food slice selector disc 130 is rotated to either the first discrete position 1 or the third discrete position 3.

It will be apparent to those skilled in the art that various modifications and variations can be made in the embodiments of the invention without departing from the spirit or scope of the invention. Thus, it is intended that embodiments of the invention cover the modifications and variations of this invention provided they come within the scope of the appended claims and their equivalents.

What is claimed is:

1. A food processor, comprising:
 a reversible motor disposed in a base for generating a rotational force;
 a processor container removably attached to the base;
 a spindle rotated by the reversible motor when energized;
 a slicing disc rotatably coupled to the spindle, the slicing disc having a radially extending slicing blade formed on one side thereof configured to perform a slicing operation and a plurality of radially extending shredding blades disposed oppositely to the slicing blade on the slicing disc configured to perform a shredding operation;
 a slice selector disc disposed beneath the slicing disc and rotatably mounted on the base such that the slice selector disc can be rotated to select one of a plurality of discrete positions, a first of the discrete positions being selected for the slicing operation, a second of the discrete positions being selected for the shredding operation and a third discrete position for a dicing operation, and the slice selector disc includes an associated first food processing configuration formed in the slice selector disc corresponding to the first discrete position being selected for the slicing operation, an associated second food processing configuration formed in the slice selector disc corresponding to the second discrete position being selected for the shredding operation, and an associated third food processing configuration formed in the slice selector disc corresponding to the third discrete position being selected for the dicing operation;
 wherein the slicing disc is automatically rotated in a first direction by the motor when the first and third discrete positions are selected on the slice selector disc corresponding to the slicing and dicing operations and the slicing disc is automatically rotated in a second direction by the motor when the second discrete position is selected on the slice selector disc corresponding to the shredding operation.

2. The food processor of claim 1, wherein the first food processing configuration formed in the slice selector disc is an aperture configured to allow food to pass through into the processor container without any further food processing after the food has been sliced by the slicing blade on the slicing disc during the slicing operation and to allow food to pass through into the processor container without any further food processing after food has been shred by the shredding blades during the shredding operation.

3. The food processor of claim 1, wherein the second food processing configuration formed in the slice selector disc is an aperture configured to allow food to pass through into the processor container without any further food processing after the food has been shredded by the shredding blades on the slicing disc during the shredding operation.

4. The food processor of claim 1, wherein the third food processing configuration formed in the slice selector disc is a dicing blade lattice configured to dice food as it passes through the dicing blade lattice into the processor container after the food has been sliced by the slicing blade on the slicing disc during the dicing operation.

5. The food processor of claim 1, wherein the first direction is counter-clockwise.

6. The food processor of claim 1, wherein the second direction is clockwise.

7. The food processor of claim 1, wherein a sensor detects when the slice selector disc is rotated to the first, second and third discrete positions to cause the slicing disc to be automatically rotated in the first direction by the motor when the first and third discrete positions are selected on the slice selector disc corresponding to the slicing and shredding operations and the slicing disc is automatically rotated in the second direction by the motor when the third discrete position is selected on the slice selector disc corresponding to the dicing operation.

8. A food preparation appliance, comprising:

a reversible rotary power source disposed in a base;

a slicing disc rotatably coupled to the source of rotary power, the slicing disc having a radially extending slicing blade formed on one side thereof configured to perform a slicing operation and a plurality of radially extending shredding blades disposed oppositely to the slicing blade on the slicing disc configured to perform a shredding operation;

a slice selector disc disposed beneath the slicing disc and rotatably mounted on the base such that the slice selector disc can be rotated to select one of a plurality of discrete positions, a first of the discrete positions being selected for the slicing operation, a second of the discrete positions being selected for the shredding operation and a third discrete position being selected for a dicing operation, and the slice selector disc includes an associated first food processing configuration formed in the slice selector disc corresponding to the first discrete position being selected for the slicing operation, an associated second food processing configuration formed in the slice selector disc corresponding to the second discrete position being selected for the shredding operation, and an associated third food processing configuration formed in the slice selector disc corresponding to the third discrete position being selected for the dicing operation;

wherein the slicing disc is automatically rotated in a first direction by the rotary power source when the first and third discrete positions are selected on the slice selector disc corresponding to the slicing and dicing operations and the slicing disc is automatically rotated in a second direction by the rotary power source when the second discrete position is selected on the slice selector disc corresponding to the shredding operation.

9. The food processor of claim 1, further including a lid that is fitted over an open top of the processor container.

10. The food processor of claim 9, further including a feed tube formed in the lid where food to be processed is inserted and directed into the slicing blade or the shredding blades formed on the slicing disc.

11. The food preparation appliance of claim 8, wherein the first food processing configuration and the second food processing configuration formed in the slice selector disc is an aperture configured to allow food to pass through without any further food processing after the food has been sliced by the slicing blade on the slicing disc during the slicing and shredding operations.

12. The food preparation appliance of claim 8, wherein the third food processing configuration formed in the slice selector disc is a dicing blade lattice configured to dice food as it passes through the dicing blade lattice after the food has been sliced by the slicing blade on the slicing disc during the dicing operation.

13. The food preparation appliance of claim 8, wherein the first direction is counter-clockwise.

14. The food preparation appliance of claim 8, wherein the second direction is clockwise.

15. The food preparation appliance of claim 8, further including a sensor that detects when the slice selector disc is rotated to the first, second and third discrete positions to cause the slicing disc to be automatically rotated in a first direction by the rotary power source when the first and third discrete positions are selected on the slice selector disc corresponding to the slicing and dicing operations and the slicing disc is automatically rotated in a second direction by the rotary power source when the second discrete position is selected on the slice selector disc corresponding to the shredding operation.

16. The food preparation appliance of claim 8, further including a processor container disposed on the base containing the slicing disc and the slice selector disc.

17. The food preparation appliance of claim 16, further including a lid that is fitted over an open top of the processor container.

18. The food preparation appliance of claim 17, further including a feed tube formed in the lid where food to be processed is inserted and directed into the slicing blade or the shredding blades formed on the slicing disc.

* * * * *